United States Patent [19]

Boelkins

[11] 3,929,161

[45] Dec. 30, 1975

[54] SPOOL VALVE FOR MULTIPLE ADJUSTABLE SYSTEMS

[75] Inventor: Wallace G. Boelkins, Grand Rapids, Mich.

[73] Assignee: Uni-Mist, Inc., Grand Rapids, Mich.

[22] Filed: Aug. 22, 1973

[21] Appl. No.: 390,569

[52] U.S. Cl. ...... 137/625.69; 137/595; 137/614.11; 137/636.4
[51] Int. Cl.² .................. F16K 11/07; F16K 11/18
[58] Field of Search.......... 137/331, 614.11, 625.34, 137/625.48, 625.69, 625.17, 636, 636.4, 137/595; 251/282, 324

[56] References Cited
UNITED STATES PATENTS

| 1,865,517 | 7/1932 | Henderson | 137/597 X |
|---|---|---|---|
| 2,847,027 | 8/1958 | Kumpman | 137/625.17 X |
| 3,000,399 | 9/1961 | Brukner | 137/625.48 |
| 3,308,849 | 3/1967 | Bohart | 137/625.17 |
| 3,426,799 | 2/1969 | Kintner | 137/625.48 |
| 3,487,435 | 12/1969 | Sheardown | 137/625.69 X |

FOREIGN PATENTS OR APPLICATIONS

| 581,038 | 8/1958 | Italy | 137/636.4 |

*Primary Examiner*—Martin P. Schwadron
*Assistant Examiner*—Richard Gerard
*Attorney, Agent, or Firm*—Price, Heneveld, Huizenga & Cooper

[57] ABSTRACT

A spool valve for directing fluid flow through selected ports therein. The valve includes a spool shaft which extends outwardly from either side of the valve body. The spool shaft includes means adapted to be connected to a rotatably variable device, such as a fluid pressure regulator, for simultaneously controlling the pressure in fluid lines, or any desired parameter controlled by such variable device connected to the valve spool, as well as means for limiting the axial movement of the spool shaft. The limiting means are removably mounted externally of the body for assembly and disassembly of the valve.

8 Claims, 5 Drawing Figures

U.S. Patent   Dec. 30, 1975   3,929,161
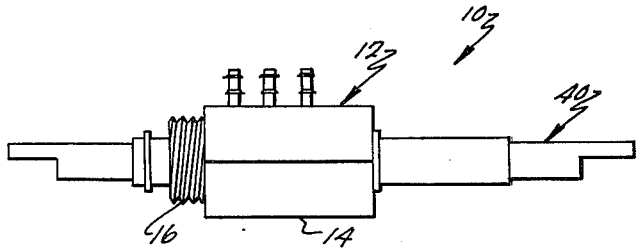
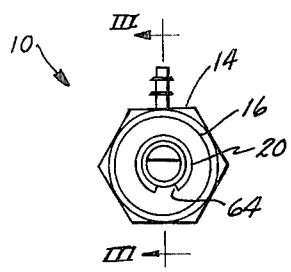
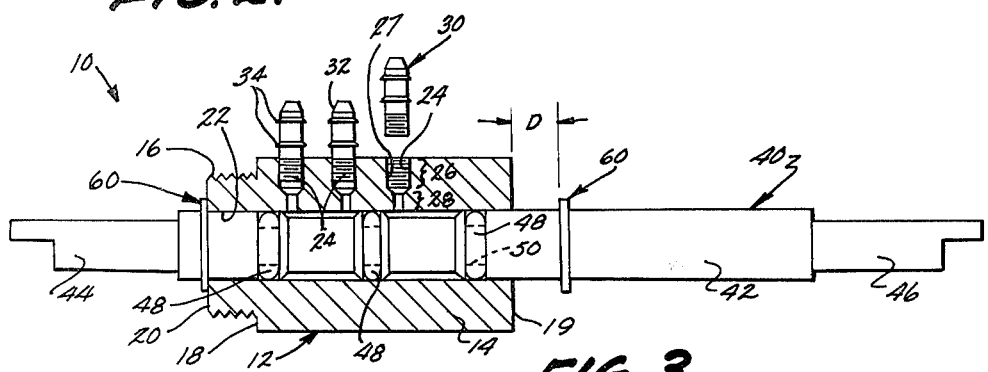
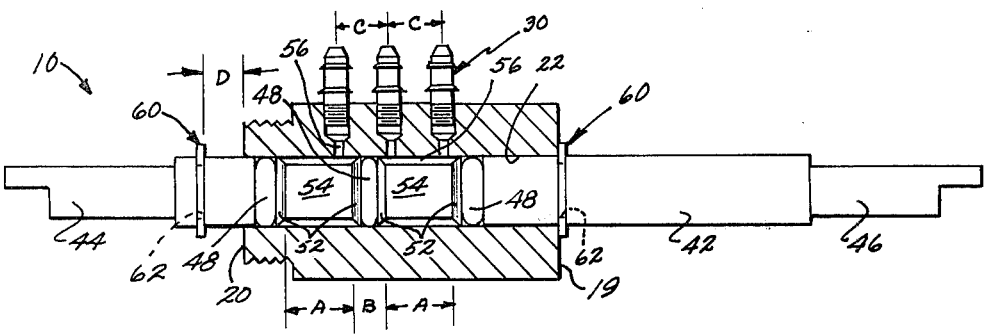
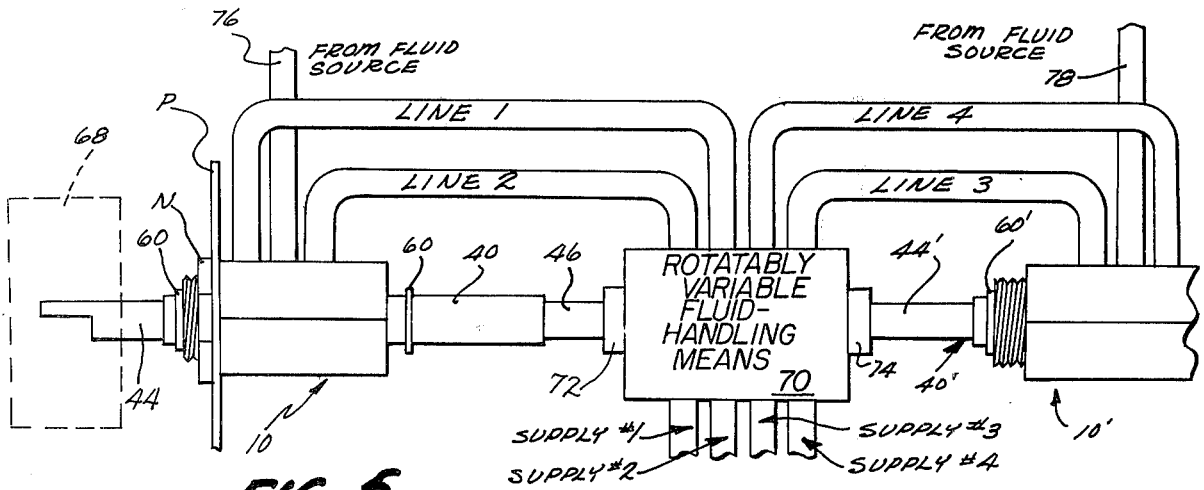

SPOOL VALVE FOR MULTIPLE ADJUSTABLE SYSTEMS

This invention relates to spool valves for controlling the flow of fluid and, more particularly, to a spool valve providing means adapted to allow simultaneous control of the direction of fluid flow and any desired rotatably variable device.

BACKGROUND OF THE INVENTION

Spool valves for the control of fluid flow including both gases and liquids are conventional and well known. Often, such valves are automatically controlled, include intricate fluid passageways, and have many complex parts included therein. Such valves often require frequent cleaning and maintenance, especially in applications where the fluids controlled thereby contain foreign materials such as oil, dirt and other substances. In many instances the simplicity and reliability of the valve are critical factors in its application. Accordingly, many of the prior known spool valves have either been so complex as to be too expensive for simple applications or have been extremely difficult to disassemble, repair, and maintain.

As associated problem lies in the application of spool valves. Spool valves conventionally are used merely to start and stop, or select the path for, fluid flow through lines connected thereto. That is, control of the valve generally shifts the input or supply fluid from one or more preselected outlets to another outlet or outlets. However, frequent difficulty has been encountered in attempting to simultaneously control additional fluid lines not directly connected to a given single valve. Further, it has been found very difficult to simultaneously control both the direction and pressure of the fluid which passes through the spool valve.

SUMMARY OF THE INVENTION

Accordingly, it is the purpose of the present invention to provide a spool valve which is adapted to selectively control fluid flow through a predetermined number of fluid lines and yet may be direct-connected or "ganged" to other devices such as similar spool valves and/or other devices which may for example include fluid pressure regulating apparatus, for the control of both the direction of flow in additional lines and/or the control of the fluid pressure in any of the fluid lines in which the flow direction is controlled. The present invention allows control of both flow direction and pressure via adjustment of a single control on the first spool valve. Further, the present spool valve is designed to be easily and economically manufactured, and yet be simple, reliable, easy to assemble and disassemble and, therefore, easy to repair and maintain.

In the preferred embodiment, the spool valve includes a valve body having a central passageway therethrough and an elongated spool shaft rotatably, axially movably, and coaxially received in the passageway. The spool shaft extends outwardly from either side of the valve body and includes a plurality of O-rings mounted in circumferential grooves at spaced points along the shaft internally of the passageway and valve body. The spool defines annular, reduced-diameter chambers between the O-rings for selectively interconnecting pairs of fluid ports extending through the valve body in communication with the passageway, upon axial movement of the spool shaft.

Although the spool is endlessly rotatable, axial movement thereof is limited by removable stop means secured thereto externally of the valve body adjacent either end of the passageway. In the preferred embodiment, these stop means comprise split-circle snap rings received in annular grooves on the spool shaft and spaced such that the spool shaft may be reciprocated between two extreme positions. Further, connecting means are provided on the end of the extended spool shaft for connection either with another of the spool valves or a rotatably variable device such as fluid pressure-regulating apparatus for controlling the fluid pressure in lines connected to either the original spool valve or multiple, interconnected spool valves. Thus, axial and rotational adjustment of the spool shaft on the first spool valve enables control of both the direction and pressure of the fluid in the lines directly connected to the first spool valve as well as fluid lines connected to other spool valves serially joined to the first.

These and other objects, advantages, purposes and features of the invention will become more apparent from a study of the following description taken in conjunction with the drawings.

BRIEF DESCRIPTION OF THE DRAWINGS

FIG. 1 is a side elevation of the spool valve of the present invention;

FIG. 2 is an end elevation of the spool valve shown in FIG. 1;

FIG. 3 is an enlarged, cross-sectional, side elevation of the spool valve taken along plane III—III of FIG. 2, showing the spool shaft in a first position and one of the port connectors disassembled from the valve body;

FIG. 4 is an enlarged, cross-sectional, side elevation similar to that of FIG. 3 but showing the spool shaft shifted to a second position; and FIG. 5 is a fragmentary, schematic representation of one application of the present spool valve illustrating two of the present spool valves and a rotatably variable fluid handling apparatus mechanically joined in series.

DESCRIPTION OF THE PREFERRED EMBODIMENT

Referring now to FIGS. 1 through 4, the spool valve 10 of the present invention includes a valve body 12 and an elongated, spool shaft 40. The valve body 12 comprises a right, hexagonal cylinder 14 having a threaded, integral, right circular, cylindrical extension 16 extending coaxially from one end 18 of the hexagonal cylinder 14. The opposite end surface 19 of hexagonal section 14 and end surface 20 of threaded extension 16 are both substantially parallel to end surface 18. Extending entirely through valve body 12, substantially perpendicular to end surfaces 19 and 20 and coaxial with both hexagonal section 14 and threaded extension 16, is a spool passageway 22. Passageway 22 receives the elongated spool shaft 40, as will be more fully described below.

Extending perpendicularly to the direction of the axis of passageway 22 are three ports or apertures 24 connecting the exterior of the valve body to the interior of the passageway 22. Each port comprises two coaxial, adjoining cylindrical sections 26 and 28, section 26 extending into the body from its outer surface and having a larger diameter than section 28, which communicates with spool passage 22. An inclined surface 27 connects the sections 26 and 28. The centers of ports 24 are spaced apart equivalent distances, represented by c in FIG. 4, in a direction parallel to the common axis of the passageway and spool shaft.

Received and retained within each of the upper sections 26 of ports 24 are cylindrical port connectors 30, each having an outside diameter matching the inside diameter of cylindrical section 26. Each port connector includes an inclined or tapered section 32 facilitating the reception of fluid lines thereover and a plurality of tapered, annular flanges 34 for grasping and sealingly retaining fluid lines which are telescoped thereover. Port connectors 30 may be threaded, press fitted or secured via other suitable means in the larger sections 26 of ports 24. When so secured, a portion thereof extends beyond the exterior surface of valve body 12 such that a sufficient area is provided, including the tapered flanges 34, for retaining fluid lines telescoped thereover.

As is best seen in FIGS. 3 and 4, elongated spool shaft 40 comprises a central section 42, which is axially slidably received through passageway 22, and cylindrical end extensions 44 and 46 extending from either end of central section 42. Central section 42 has an outside diameter only slightly less than the inside diameter of passageway 22, such that it closely mates with and slides through passageway 22. In the preferred embodiment, extensions 44 and 46 have diameters less than central section 42. However, it will be apparent that depending on the devices or apparatus to be connected to sections 44 and 46, the sizes of the latter may be varied accordingly.

Intermediate the ends of central section 42 are a plurality of O-rings 48, each received in an annular groove 50 having a diameter less than the diameter of central section 42. O-rings 48 have an outside diameter slightly larger than the inside diameter of passageway 22, such that they form a fluid-tight seal against the smooth interior of that passageway. Spool 40 is necked-down on either side of the central O-ring and its annular groove 50 to provide integral collars 52 for retaining the O-ring in its proper position. The O-rings on either side of the central O-ring are retained in position by the full diameter of central section 42 and a single annular collar 52, as illustrated. O-rings 48 and their associated securing means are spaced along the axis of spool shaft 40 with reduced diameter, annular sections 54 intervening therebetween. Annular sections 54 have a length represented by the symbol A in FIG. 4, and define annular chambers 56 adjacent the walls of the passageway 22. Annular sections 54 are separated by a central O-ring 48 and its associated bevel collars 52, these collars and the O-ring having an overall width represented by the symbol B in FIG. 4.

As will be understood from FIG. 4, the length of annular sections 54 and, therefore, of annular chambers 56 (distance A), is slightly greater than the effective distance between the ports 24 (distance C). Accordingly, when elongated spool shaft 40 is axially shifted within passageway 22, central O-ring 48 and its associated collars 52, having a width B, shift from one side of central port 24 to the other. This results in fluid communication alternately between the central port and either the left or right ports, as will be understood from a comparison of the positions of the spool shaft in FIGS. 3 and 4.

In order to limit the axial movement of spool 40 in passageway 22 and in order to provide a means for assembling the spool within that passageway, removable stop rings or clips 60 are snapped into reduced diameter annular grooves 62 provided adjacent either end of passageway 22 on central section 42 of spool 40. Stop rings 60 are formed from a spring-type material and have a tapered split 64 therein (FIG. 2) such that they may be snapped over the reduced diameter of groove 62. The outside diameter of spring stop rings 60 is somewhat larger than the inside diameter of passageway 22, as seen in FIGS. 3 and 4, such that they provide a secure abutment against the ends 19 and 20 of valve body 12.

Each of the snap rings 60 is precisely spaced relative to the ends of passageway 22 in order to enable the spool to be axially shifted a predetermined distance to selectively bring the central port 24 in fluid communication with either the left or right hand ports 24 as shown in FIGS. 3 and 4. As shown in those figures, when either of the stop rings 60 is in abutting engagement with an end 19 or 20 of the valve body 12, the opposite snap ring 60 is spaced a distance D from the other end of the valve body. Distance D is slightly greater than the overall width B of central O-rings 48 and collars 52. Thus, distance D provides sufficient distance for the spool to shift axially such that the entirety of central O-ring 48 and associated collars 52 moves from one side of central port 24 to the other. The spool shaft 40 is continuously or endlessly rotatable through 360° within passageway 22, a factor which facilitates its adaptation to many applications, as will be more fully explained below. Of course, the spool shaft may be shifted to a central position (not shown) wherein the lateral two O-rings block any fluid communication of the central port with either of the lateral two ports 24.

Assembly of the spool valve 10 is a simple operation comprising fitting O-rings 48 in grooves 50, inserting shaft 40 in passageway 22 and snapping stop rings 60 into grooves 62. Port connectors 30 are screwed or secured in place either before or after this. Disassembly requires only the removal of one stop ring after which shaft 40 may be slid from the passageway.

In a preferred embodiment, valve body 12, port connectors 30, and spool shaft 40 are all formed from a non-corrosive, highly machinable material such as brass or stainless steel. O-rings 48 are preferably formed from a resilient, wear-resistant material which forms an effective seal against the interior of passageway 22, such as Buna N rubber or its equivalent. Split, stop rings 60 are preferably formed from a resilient spring material such as spring steel.

Referring now to FIG. 5, one of many possible applications of the present inventive spool valve 10 is illustrated. Spool valve 10 is secured to a control panel P of a hydraulic system, compressed air system or the like, via a nut N threadably secured over threaded extension 16. The extending portion 44 of spool shaft 40 extends outwardly from the front of the panel, for control of the valve 10 and is adapted to receive a control knob 68 or the like. The remainder of the valve extends behind and is covered by control panel P. Spool valve 10 is connected in series with a desired known type of rotatably variable device 70, such as a fluid pressure regulating apparatus or other known fluid-handling device (or for that matter even a non-fluid-handling device) 70 which, in the embodiment shown for illustration, is connected in series to another of the inventive spool valves 10'. In this respect, the extending end 46 of valve 10 is axially movably secured in a complementary-shaped coupling or other connecting means 72, while the extending end 44' of valve 10' is secured in a similar coupling or connecting means 74 on the opposite side of the apparatus 70. Thus, spool shafts 40 and 40' are allowed to shift axially as well as rotate fully through 360° through the apparatus 70.

In operation, an input fluid line 76 (FIG. 5) leads from a source of hydraulic fluid or compressed air to the central port on valve 10. Output or supply lines 1 and 2 lead from the left and right ports on valve 10 to input ports on the apparatus 70. Similarly, an input line 78 from the hydraulic or compressed air fluid source leads to the central port on valve 10'. Output or supply lines 3 and 4 lead from the lateral ports on valve 10' to associated input ports on 70. Each of the input ports on the apparatus 70 has a corresponding outlet or supply line as illustrated.

As will now be understood, the flow of fluid passing into valves 10 and 10' through lines 76 and 78, respectively, may be selectively controlled to pass through lines 1 and 3 simultaneously by placing spool shafts 40 and 40' in the position shown in FIG. 3. Alternatively, if the spool shafts 40 and 40' are shifted to the left in FIG. 5 (i.e., to the position shown in FIG. 4), the volume of fluid entering valve 10 and 10' would pass through lines 2 and 4 into the apparatus 70. Once the desired axial position of the spool shafts has been determined, the rotational position of the spool shafts may be adjusted to actuate the rotatably-variable device and thereby change whatever fluid parameter is involved as a result of the particular variable device selected, such as for example the pressure of the fluid in selected lines exiting through supply outlets 1 and 3 or 2 and 4 from apparatus 70. All of these adjustments are made by controlling the position of the single control knob 68. Therefore, it will be understood that control and adjustment of the single shaft 44 via knob 68 may simultaneously control the choice of the lines through which fluid flow will occur, as well as the fluid pressure in those lines.

To facilitate connection of the spool shafts, each of the end extensions 44 and 46 includes a right cylindrical extension 47 having a cross-sectional shape of a section of a circle. Thus, sections 47 may be inserted in mating receptacles in the fluid pressure regulating or other apparatus or a connector for connection to another serially connected spool valve as desired.

As is now apparent, the present inventive spool valve 10 may be connected in series with other spool valves or to other fluid-handling apparatuses as desired. Such connection allows the control of the volume of fluid passing through preselected lines as well as the simultaneous control of another fluid parameter in those lines. The valves may be used alone with single rotatably variable apparatus or in series therewith as illustrated. Consequently, the present spool valve provides a simple, reliable, easily assembled and maintained fluid control device allowing the simultaneous control of both volume and a parameter such as pressure of the controlled fluid.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow.

The embodiments of the invention in which an exclusive property or privilege is claimed are defined as follows:

1. In a spool valve including a valve body having a passageway therethrough, an elongated spool shaft rotatably, axially movably, and coaxially received in said passageway, a plurality of ports communicating with said passageway, and means on said spool shaft providing a fluid seal for said shaft in said passageway and for selectively interconnecting certain of such ports for fluid communication in response to axial movement of said shaft; the improvement comprising said spool shaft having a length sufficient to protrude at both its ends beyond said body; said spool shaft further including rotatable drive connection means on at least one of its said protruding ends for rotatable drive connection of said shaft to a rotatably variable device such that shaft rotation is transmitted to such device, whereby axial movement of said spool may actuate said valve while rotational movement of the spool varies said device; and including removable abutment means on said spool shaft external of said valve body and adjacent to parts of said body for limiting the axial movement of said shaft and for selective disassembly of said shaft from said body.

2. The spool valve of claim 1 wherein said removable abutment means comprises a resiliently expandable element fitted in a groove on said spool shaft.

3. The spool valve of claim 1 wherein said removable means comprise stop means adjacent either end of said passageway in said valve body; said fluid seal means on said spool shaft including sealing means for preventing fluid communication between a selected two of said plurality of ports; said stop means together spaced from one another and from said valve body an amount such that when one engages said body the other is spaced from said body a distance sufficient to allow said shaft to be moved axially toward said one stop means a distance sufficient to shift said sealing means from one side of one of said ports to the other side thereof thereby placing in fluid communication said selected two ports which were previously separated by said sealing means.

4. The spool valve of claim 3 wherein said stop means comprise spring clips fitted in grooves on said spool shaft, said spring clips being larger than the maximum cross-sectional dimension of said passageway.

5. The spool valve of claim 1 wherein said valve body includes three ports each having a center spaced a predetermined distance from the next along a plane parallel to the axis of said passageway in said valve body, said spool shaft including three sealing rings therearound, each of said rings being spaced from the next a distance greater than said predetermined distance but less than twice said predetermined distance; each such ring having a predetermined width parallel to said passageway axis; said removable means comprising stop means on either end of said passageway in said valve body and spaced from said valve body such that when one of said stop means engages said body, the other is spaced from said body a distance slightly greater than said predetermined width of said sealing rings.

6. The spool valve of claim 1 wherein said connection means comprise an integral extension on at least one end of said spool shaft.

7. The spool valve of claim 6 wherein said connection means comprise integral extensions on either end of said spool shaft.

8. The spool valve of claim 7 wherein said connecting means comprise integral extensions on each end of said spool shaft; said extensions being noncircular in transverse cross section.

* * * * *